W. LINDEMANN.
OATS SAVER.
APPLICATION FILED JAN. 22, 1918.
1,282,701.
Patented Oct. 22, 1918.
2 SHEETS—SHEET 1.
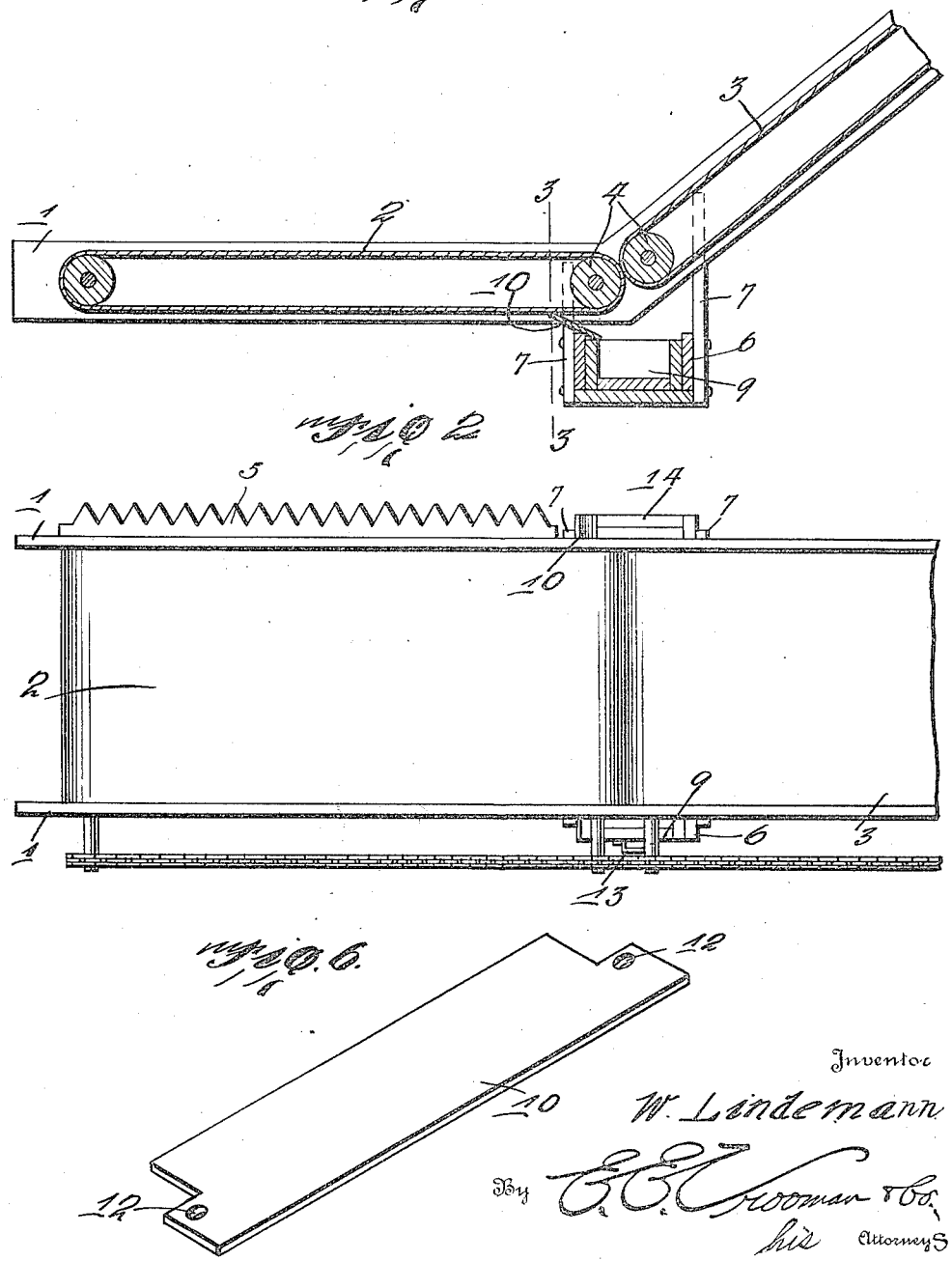

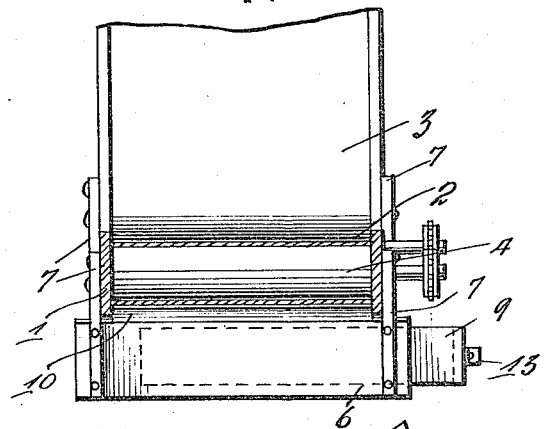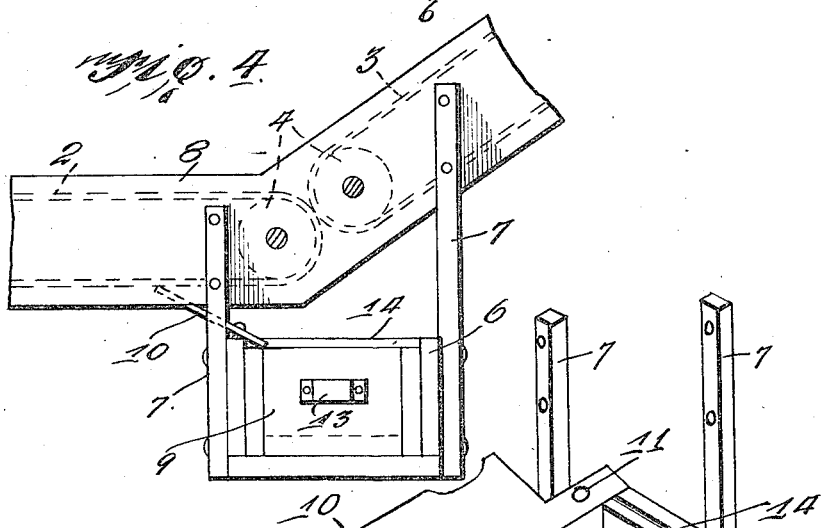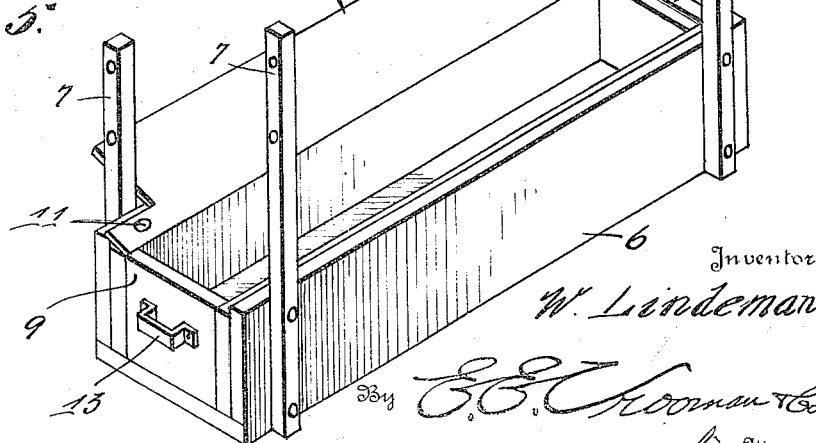

UNITED STATES PATENT OFFICE.

WALTER LINDEMANN, OF PEOTONE, ILLINOIS.

OATS-SAVER.

1,282,701.         Specification of Letters Patent.         Patented Oct. 22, 1918.

Application filed January 22, 1918. Serial No. 213,189.

*To all whom it may concern:*

Be it known that I, WALTER LINDEMANN, citizen of the United States of America, residing at Peotone, in the county of Will and State of Illinois, have invented certain new and useful Improvements in Oats-Savers, of which the following is a specification, reference being had therein to the accompanying drawing.

This invention relates to an oats saver, which is especially adapted for use in connection with grain harvesting machines.

The principal object of the present invention is the production of a simple and efficient means which may be suspended below the conveyer frame, at a point where two conveyers abut, whereby oats which might drop between the aprons while passing from one to the other, may be prevented from dropping upon the ground.

Another object of this invention is the production of a simple and efficient means for collecting oats, and permitting the same to be moved to a place of storage.

With these and other objects in view this invention consists of certain novel constructions, combinations and arrangements of parts, as will be hereinafter fully described and claimed.

In the accompanying drawings:—

Figure 1 is a longitudinal section through a conveyer apron, showing the oat saving device, or trough positioned or suspended below the rollers which support the abutting ends of the conveyer aprons.

Fig. 2 is a top plan view of the structure shown in Fig. 1.

Fig. 3 is a transverse section taken on line 3—3 of Fig. 1.

Fig. 4 is an enlarged end elevation of the oats collecting trough.

Fig. 5 is a detail perspective of the trough mechanism.

Fig. 6 is a detail perspective of a chute plate used in connection with the present invention.

By referring to the drawings, it will be seen that 1, designates a frame of the conveyer, which is provided with a primary horizontal conveyer belt 2, and an auxiliary inclined belt 3. The conveyer belts 2 and 3 pass over the adjacent rollers 4, as shown clearly in Fig. 1 of the drawings. A suitable cutting knife or sickle 5 is supported upon the front end of the frame 1, in any suitable or desired manner, and may be operated by means of any suitable or desired mechanism without departing from the spirit of the present invention.

A trough 6 is positioned below the frame 1, at a point below the junction of the rollers 4, as shown in Fig. 1 of the drawings. This trough 6 is substantially U-shaped in cross section, and is provided with suitable side walls which side walls carry the hanger arms 7. These hanger arms 7 engage the side plates 8 of the frame 1, as shown clearly in Fig. 4 of the drawings. A slide drawer 9 is mounted within the trough 6 and is adapted to move therein, for the purpose of permitting an operator to withdraw the drawer from the trough 6 and empty the oats collected thereby from the drawer. A suitable chute plate 10 is supported upon one side of the trough 6 as shown clearly in Figs. 1 and 5 of the drawings, by means of suitable pins 11 passing through the apertures 12 formed near the respective ends of the plate 10. This chute plate 10 is adapted to engage the under face of the apron 2 and scrape any oats which may adhere to the apron from the surfaces of the apron, and cause the oats to be delivered down into the drawer 9, which is carried by the shaft 6. This plate 10 overhangs the side edge of the trough 6 and also one of the side edges of the drawer 9, so as to deliver the oats into the body of the drawer, as will be obvious by carefully considering Figs. 1 and 5 of the drawings. It should of course be understood that a suitable handle 13 is provided upon the drawer, in order that the drawer may be moved outwardly when so desired, for the purpose of dumping the oats therefrom. The trough 6 is provided with an end closure wall 14 at its rear end, for the purpose of constituting an abutment against which the drawer 9 may abut, when the drawer is moved inwardly to a closed position. As above described, the trough 6 is suspended upon the frame 1, directly below the point of abutment between the rollers 4 and it has been found by experience that a considerable amount of oats is lost by permitting the oats to drop between the rollers, when the same should be carried upwardly upon the frame 3. By means of the present device, however, this waste will be eliminated, for the reason that the oats collected in the drawer 9, may be easily collected and saved for consumption.

What is claimed is:—

In combination in an oats harvesting machine, a frame, a pair of conveyers, a trough suspended upon said frame below the point of juncture of said conveyers, a drawer slidably mounted within said trough, and a chute plate carried by said trough and scraping upon the under run of one of said conveyers for cleaning oats from the same.

In testimony whereof I hereunto affix my signature.

WALTER LINDEMANN.

Copies of this patent may be obtained for five cents each, by addressing the "Commissioner of Patents, Washington, D. C."